(12) United States Patent
Miller et al.

(10) Patent No.: US 8,103,412 B2
(45) Date of Patent: Jan. 24, 2012

(54) SYSTEM AND METHOD FOR CONTROLLING BLIND SPOT MONITORING AND CROSS TRAFFIC ALERT BASED ON DRIVER STATUS

(75) Inventors: Thomas Lee Miller, Ann Arbor, MI (US); Eric L. Reed, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 721 days.

(21) Appl. No.: 12/139,070

(22) Filed: Jun. 13, 2008

(65) Prior Publication Data

US 2009/0312914 A1    Dec. 17, 2009

(51) Int. Cl.
*G08G 1/16* (2006.01)
(52) U.S. Cl. .......................................... 701/45; 701/301
(58) Field of Classification Search .................... 701/29, 701/36, 45, 49, 301; 340/5.1, 5.21, 5.2, 5.6, 340/5.61
See application file for complete search history.

(56) References Cited

U.S. PATENT DOCUMENTS

| | | | |
|---|---|---|---|
| 5,769,051 A | 6/1998 | Bayron et al. | |
| 5,803,043 A | 9/1998 | Bayron et al. | |
| 6,386,007 B1 | 5/2002 | Johnson et al. | |
| 6,430,488 B1 | 8/2002 | Goldman et al. | |
| 6,518,882 B2 | 2/2003 | Johnson et al. | |
| 6,675,082 B2 | 1/2004 | Galli et al. | |
| 6,772,061 B1 | 8/2004 | Berthiaume et al. | |
| 6,952,156 B2 | 10/2005 | Arshad et al. | |
| 6,998,956 B2 | 2/2006 | Dix | |
| 7,006,914 B1 | 2/2006 | Cahoom | |
| 7,075,409 B2 | 7/2006 | Guba | |
| 7,757,803 B2 | 7/2010 | Fiske et al. | |
| 7,959,177 B2 | 6/2011 | Fiske et al. | |
| 2004/0263316 A1 | 12/2004 | Dix et al. | |
| 2006/0114101 A1 | 6/2006 | Schambeck et al. | |
| 2006/0287828 A1* | 12/2006 | Lehner .......................... | 701/301 |

(Continued)

FOREIGN PATENT DOCUMENTS

| | | |
|---|---|---|
| DE | 19961619 A1 | 6/2001 |
| GB | 2273508 A | 6/1994 |

OTHER PUBLICATIONS

Ultrasonic Sensor, (MaxSonar-EZ1, EMANT Pte Ltd) Jun. 24, 2007, [online], retrieved on Jun. 24, 2007] Retrieved from the Wayback Machine Internet Archive <URL: http://replay.waybackmachine.org/20070624222256/http://www.emant.com/index.php?tid=100011>.*

(Continued)

*Primary Examiner* — Paul N Dickson
*Assistant Examiner* — Barry Gooden, Jr.
(74) *Attorney, Agent, or Firm* — Jennifer M. Stec; Brooks Kushman P.C.

(57) ABSTRACT

A system for controlling the operation of performing at least one of blind spot monitoring and cross traffic alert in a vehicle based on driver status is provided. The system comprises a controller configured to receive at least one driver status signal indicative of whether the driver of the vehicle is one of the primary driver and the secondary driver. The controller is configured to determine whether the driver of the vehicle is the primary or the secondary driver based on the at least one driver status signal. The controller is configured selectively control the operation of performing the at least one of blind spot monitoring and cross traffic alert based on whether the driver of the vehicle is the primary driver or the secondary driver.

19 Claims, 8 Drawing Sheets

U.S. PATENT DOCUMENTS

| | | | |
|---|---|---|---|
| 2007/0115105 A1* | 5/2007 | Schmitz | 340/439 |
| 2007/0179712 A1* | 8/2007 | Brandt et al. | 701/300 |
| 2007/0279199 A1* | 12/2007 | Danz et al. | 340/435 |
| 2009/0037104 A1* | 2/2009 | Basson et al. | 701/213 |
| 2009/0210157 A1* | 8/2009 | Lee | 701/301 |

OTHER PUBLICATIONS

Patty Mattern, "Getting smarter at getting safer", University of Minnesota, UMNnews, Sep. 13, 2005, 2 pages.

* cited by examiner

SYSTEM AND METHOD FOR CONTROLLING BLIND SPOT MONITORING AND CROSS TRAFFIC ALERT BASED ON DRIVER STATUS

CROSS-REFERENCE TO RELATED APPLICATIONS

This application generally relates to U.S. Pat. Ser. No. 12/026,852, entitled "SYSTEM AND METHOD FOR CONTROLLING A SAFETY RESTRAINT STATUS BASED ON DRIVER STATUS" and filed on Feb. 6, 2008; Ser. No. 12/026,857, entitled "SYSTEM AND METHOD FOR CONTROLLING EARLY LOW FUEL WARNING BASED ON DRIVER STATUS" and filed on Feb. 6, 2008; Ser. No. 12/026,867, entitled "SYSTEM AND METHOD FOR CONTROLLING ELECTRONIC STABILITY CONTROL BASED ON DRIVER STATUS" and filed on Feb. 6, 2008; Ser. No. 12/026,872, entitled "SYSTEM AND METHOD FOR CONTROLLING OBJECT DETECTION BASED ON DRIVER STATUS" and filed on Feb. 6, 2008; Ser. No. 12/138,976, entitled "SYSTEM AND METHOD FOR CONTROLLING OCCUPANT COMMUNICATION DEVICE BASED ON DRIVER STATUS" and filed on Jun. 13, 2008, Ser. No. 12/139,028, entitled "SYSTEM AND METHOD FOR CONTROLLING AN EMERGENCY NOTIFICATION OPERATION BASED ON DRIVER STATUS" and filed on Jun. 13, 2008 all of which are hereby incorporated by reference in their entirety.

BACKGROUND

1. Technical Field

The embodiments of the present invention generally relate to a system and method for controlling blind spot monitoring and cross-traffic alert based on driver status in a vehicle.

2. Background Art

With conventional automotive vehicles, one or more keys are often shared between any number of drivers. For example, the parents of a teenager (or young adult) that is old enough to drive may share the keys for the vehicle with the teenager. The vehicle may be equipped with various safety and/or driver notification features that may be enabled/disabled via a user interface based on the driver's needs. However, in some circumstances, the parent may not intend to have the various safety and notification related features disabled by the teenager. The parent may enable the safety and notification features prior to allowing the teenager to drive the vehicle, however there is no guarantee that the teenager may keep the safety and notification features enabled while driving the vehicle. Conventional vehicles fail to give parents, or other such primary drivers, the option of preventing teenagers eligible to driver or other such secondary drivers from disabling safety and notification features.

SUMMARY

In at least one embodiment, a system for controlling the operation of performing at least one of blind spot monitoring and cross traffic alert in a vehicle based on driver status is provided. The system comprises a controller configured to receive at least one driver status signal indicative of whether the driver of the vehicle is one of the primary driver and the secondary driver. The controller is configured to determine whether the driver of the vehicle is the primary or the secondary driver based on the at least one driver status signal. The controller is configured to selectively control the operation of performing the at least one of blind spot monitoring and cross traffic alert based on whether the driver of the vehicle is the primary driver or the secondary driver.

DETAILED DESCRIPTION

The embodiments of the present invention generally provide for a driver identification functional operation whereby primary and secondary drivers are determined and various levels of control are granted to the driver based on whether the driver is the primary driver or the secondary driver. In general, the primary driver may be defined as the administrative driver who has greater control over the functionality of the various safety and/or notification features in the vehicle. The secondary driver may be defined as a restricted driver who has limited control over the safety and/or notification features generally provided by the vehicle and is to abide by the functional restrictions imposed or selected by the vehicle or the primary driver. The embodiments of the present invention provides but are not limited to inhibiting a seatbelt restraint status disable, inhibiting a forward collision warning (FCW) disable, inhibiting an electronic stability control (ESC) disable, inhibiting a traction control (TC) disable, adjusting the operation of a low fluid level warning or low fuel level warning, and inhibiting blind spot monitoring disable and inhibiting cross traffic alert disable. The inhibiting and adjusting operations may be based on the status of the driver.

The embodiments of the present invention as set forth in FIGS. 1-8 generally illustrate and describe a plurality of controllers (or modules), or other such electrically based components. All references to the various controllers and electrically based components and the functionality provided for each, are not intended to be limited to encompassing only what is illustrated and described herein. While particular labels may be assigned to the various controllers and/or electrical components disclosed, such labels are not intended to limit the scope of operation for the controllers and/or the electrical components. The controllers may be combined with each other and/or separated in any manner based on the particular type of electrical architecture that is desired or intended to be implemented in the vehicle.

Figure 1:
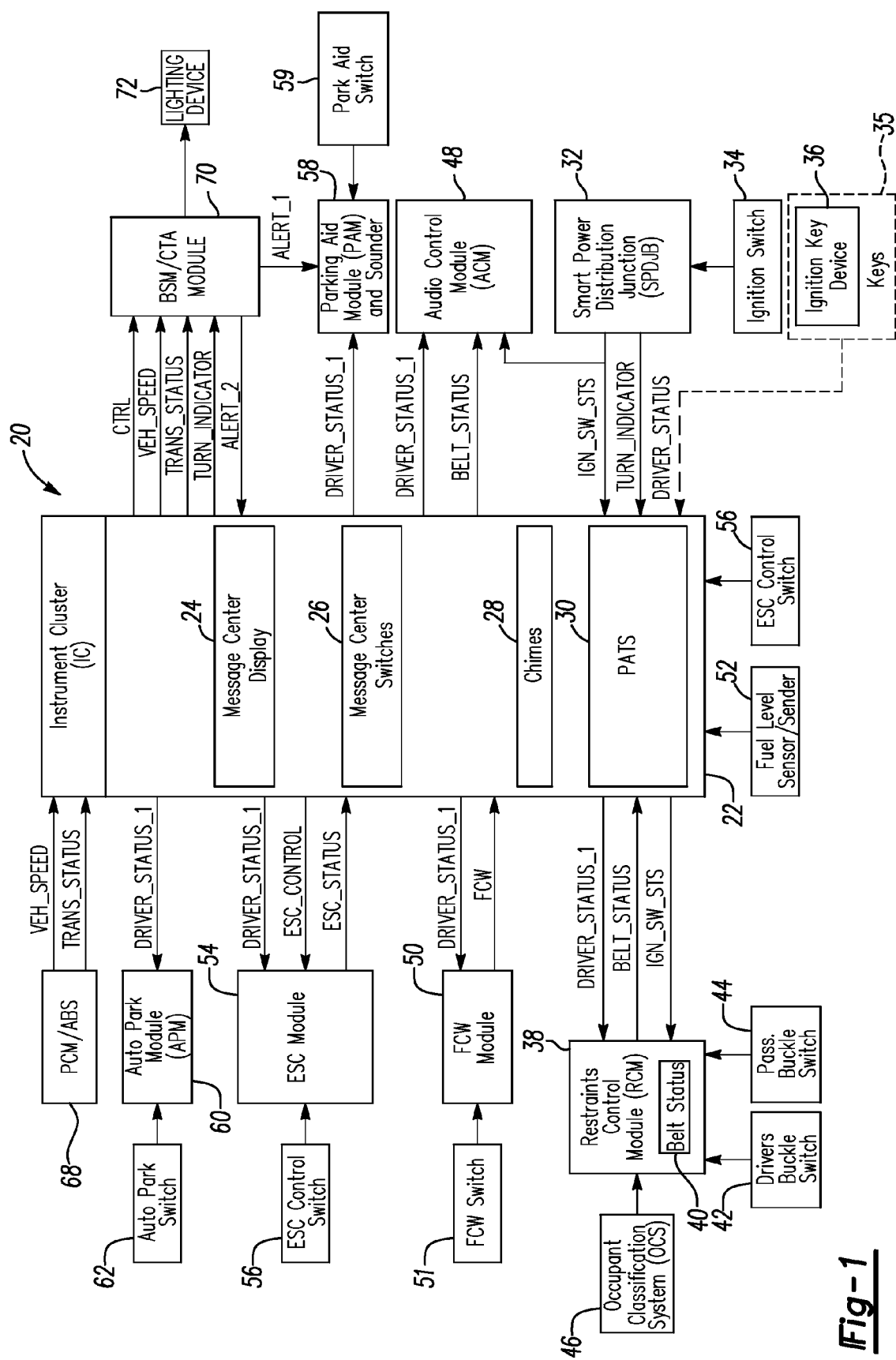
FIG. 1 depicts a system for differentiating between primary and secondary drivers of a vehicle and for controlling the operation of various vehicle features based on the status of the driver in accordance to one embodiment of the present invention.

FIG. 1 depicts a system 20 for differentiating between the primary and secondary drivers of the vehicle and for controlling the operation of various vehicle features based on the status of the driver. The system 20 generally comprises an instrument cluster controller 22. The instrument cluster controller 22 (or cluster) includes a message center display 24. The message center display 24 displays various information such as the various states of vehicle functionality to the driver. For example, the message center display 24 may display and not limited to a driver identification message during vehicle startup, various administrative menu options, a seatbelt warning message, a speed limit start up message, vehicle near top speed message, top speed message, driver identification speed warnings, and/or an inhibit ESC and FCW message.

The cluster 22 also includes a plurality of message center switches 26 and chimes 28. The driver may toggle the message center switches 26 to view different messages and/or respond to various prompts directed to the driver by the vehicle. The chimes 28 may audibly notify the driver when predetermined vehicle conditions have been met. In one example, the cluster 22 may activate the chimes 28 when the vehicle is near a top speed, the vehicle has achieved a top speed, the vehicle has exceeded the top speed, there is a low level of fuel in the fuel tank, and/or when the TC is enabled.

The cluster 22 includes a passive anti-theft security (PATS) controller 30. While FIG. 1 generally illustrates that the PATS controller 30 is positioned within the cluster 22, other implementations may include the PATS controller 30 being implemented as a standalone controller and positioned external to the cluster 22. A smart power distribution junction box (SPDJB) controller 32 may be operably coupled to the cluster 22. The cluster 22 and the SPDJB controller 32 may communicate with each via a multiplexed bus. In general, all of the signals transmitted to/from the cluster 22 may be transmitted via the multiplexed bus. The multiplexed bus may be implemented as a High/Medium Speed Controller Area Network (CAN) bus, a Local Interconnect Network (LIN) bus or any other type of multiplexed data bus generally situated to facilitate data transfer therethrough. The particular type of multiplexed bus used may be varied to meet the desired criteria of a particular implementation. The SPDJB controller 32 may include a plurality of fuses, relays, and various micro-controllers for performing any number of functions related to the operation of interior and/or exterior electrically based functionality of the vehicle. Such functions may include but are not limited to electronic unlocking/locking (via interior door lock/unlock switches), remote keyless entry operation, vehicle lighting (interior and/or exterior), electronic power windows, and/or key ignition status (e.g., Off, Run, Start, Accessory (ACCY)).

An ignition switch 34 may be operably coupled to the SPDJB controller 32. The SPDJB controller 32 may receive hardwired signals indicative of the position of the ignition switch 34 and transmit multiplexed messages on the multiplexed bus that are indicative of the position of the ignition switch. For example, the SPDJB controller 32 may transmit a signal IGN_SW_STS over the multiplexed bus to the cluster 22. The SPDJB controller 32 may transmit the signal IGN_SW_STS to any controller coupled to the multiplexed bus that may need key ignition status as an input to perform a particular function. As noted above, the SPDJB controller 32 may control various lighting features for the vehicle. The SPDJB controller 32 may transmit a signal TURN_INDICATOR to the cluster 22. The signal TURN_INDICATOR generally corresponds to the status of the turn indicators (e.g., whether the turn indicators are on/off) of the vehicle.

The ignition switch 34 may receive one or more keys 35. The keys 35 may be tagged or associated with the primary driver and the secondary driver of the vehicle. The key 35 includes an ignition key device 36 embedded therein for communicating with the vehicle. The ignition key device 36 comprises a transponder (not shown) having an integrated circuit and an antenna. The transponder is adapted to transmit an electronic code as a signal DRIVER_STATUS to the PATS controller 30. The signal DRIVER_STATUS may be indicative of which driver (e.g., primary or secondary) is driving the vehicle. The signal DRIVER_STATUS may be in the form of radio frequency (RF) based signal or a radio frequency identification (RFID) tag which corresponds to hexadecimal-based data. The PATS controller 30 determines if the hex data in the RFID tag matches predetermined hex data stored therein (e.g., in a look up table of the PATS controller 30) prior to allowing the vehicle to start for anti-theft purposes. In the event the RFID tag matches the predetermined hex data, a powertrain control module (or engine controller) 60 operably coupled to the PATS controller 30 allows the vehicle to start the engine. In general, the vehicle assembly plant, supplier facility (e.g., manufacturer of the keys and/or PATS controller 30), or car dealership performs the operation of learning the RFID tag of the keys 35 to the vehicle prior to delivery the vehicle to the end user.

The PATS controller 30 may also use the signal DRIVER_STATUS for purposes of identifying whether the driver of the vehicle is the primary driver or the secondary driver. For example, the PATS controller 30 may transmit a signal DRIVER_STATUS_1 to indicate whether the particular driver is the primary driver or the secondary driver to various vehicle controllers or modules as either multiplexed message data or hardwired signals. Prior to the PATS controller 30 transmitting the signal DRIVER_STATUS_1, the primary and secondary keys must be learned to the PATS controller 30.

The system 20 may employ different operations for associating the keys 35 to the primary and secondary drivers. In one implementation, the PATS controller 30 may employ a sequential based operation for associating the keys 35 to the primary and secondary drivers. For example, during the learn operation whereby the RFID tag for a particular key is learned to the vehicle to support the passive anti-theft function, the PATS controller 30 may assign priority status to the first key learned which in essence tags the first key as the primary key. The RFID tag of the first key learned to the vehicle may be assigned a higher status than the second key. The RFID tag of the second key when learned to the vehicle may be designated by the PATS controller 30 as the secondary key. The particular order with respect to when a key is assigned primary or secondary status may be varied to meet the designed criteria of a particular implementation. In addition, any number of spare keys may be tagged as being either primary or secondary. For example, any number of replacement or spare keys may be learned to the vehicle and designated as either a primary or a secondary key. After the PATS controller 30 tags the keys 35 as either primary or secondary keys, the PATS controller 30 sends the signal DRIVER_STATUS_1 over the bus to indicate whether the driver of the vehicle is the primary or secondary driver. The tag operation may be performed simultaneously with the process of learning the keys 35 to the PATS controller 30 for passive anti-theft purposes.

In another implementation, the PATS controller 30 may add additional data to the RFID tag to correspond to whether the driver of the vehicle is the primary or the secondary driver. The RFID tag may include a byte which includes predetermined hex values that corresponds to whether the driver of the vehicle is the primary or secondary driver. For example, the byte may include the value "FE" which corresponds to the primary driver. The PATS controller 30 upon receiving the RFID tag with the "FE" value may recognize the particular key as a primary key and determine that the status of the driver is the primary driver. The byte may also include the value "FF" in the place of "FE" which corresponds to the secondary driver. The PATS controller 30 upon receiving the RFID tag with the value "FF" may recognize the particular key as a secondary key and determine that the status of the driver is the secondary driver. It should be noted that the hex bytes "FE" and "FF" are used for illustrative purposes. The particular type of hex data and the length of data used to correspond to the primary and secondary drivers may vary based on the desired criteria of a particular implementation.

In yet another implementation, the primary driver may program one or more keys as a secondary key and/or change status of the secondary key back to a primary key as disclosed in co-pending U.S. Pat. Ser. No. 12/139,005, entitled "SYSTEM AND METHOD FOR PROGRAMMING KEYS TO ESTABLISH PRIMARY AND SECONDARY DRIVERS" and filed on Jun. 13, 2008, which is hereby incorporated by reference in its entirety.

A restraint control module (RCM) 38 may be operably coupled to the cluster 22 via the multiplexed bus. The RCM 38 may deploy various safety restraint systems in response to the vehicle experiencing impact with an object. For example, the restraint control module 38 may deploy one or more airbags positioned about the vehicle, motorized pretensioners, and/or seat controls to reduce the risk of injury to vehicle occupants in the event the vehicle experiences an impact.

A seatbelt status controller 40 may be operably coupled to the restraints control module 38. While FIG. 1 generally illustrates that the seatbelt status controller 40 is positioned within the RCM 38, additional configurations may include positioning the seatbelt status controller 40 out of the RCM 38. The seatbelt status controller 40 is generally adapted to notify the driver that one or more seatbelts in the vehicle have not been fastened or are in an unbuckled state. The seatbelt status operation controller is disclosed in U.S. Pat. No. 6,278,358 to Spoto et al.; U.S. Pat. No. 6,362,734 to McQuade et al.; and U.S. Pat. No. 6,501,374 to King et al. which are assigned to the assignee of the present invention and are hereby incorporated by reference in their entirety.

A driver's buckle switch 42 is coupled to the seatbelt status controller 40 and generally presents data indicative of whether the driver's seatbelt is fastened to the driver. A passenger buckle switch 44 is also coupled to the seatbelt status controller 40 and generally presents data indicative of whether the passenger's seatbelt is fastened. An occupant classification system 46 may be optionally coupled to the seatbelt status controller 40 for providing information with respect to the position of the occupants in the vehicle. The seatbelt status controller 40 may use such information provided by the occupant classification system 46 to determine which seat is occupied by an occupant. Based on vehicle occupant location, the seatbelt status controller 40 may have knowledge with respect to which seatbelts may need to be monitored by the seatbelt status controller 40.

In general, the seatbelt status controller 40 is generally adapted to audibly and visually notify the occupant in the vehicle that one or more of the seatbelts are not fastened when the ignition is in the run position and the vehicle speed is above a predetermined speed threshold. In addition, the seatbelt status controller 40 may be deactivated if at any time the seatbelt is fastened (or buckled), or after the seatbelt status controller 40 has audibly and visually notified the occupant for a predetermined amount of time (e.g., five minutes). The seatbelt status controller 40 includes a chime (not shown) for audibly notifying the driver in the event one or more of the seatbelts are not fastened, the vehicle speed has reached and/or exceeded the predetermined vehicle speed threshold, and the position of the ignition switch 34 is in run. The seatbelt status controller 40 may transmit a signal BLT_STS over the multiplexed bus to the cluster 22 so that the cluster 22 visually notifies the driver via the message center display 24 or with a telltale indicator that one or more of the seatbelts are not fastened (or buckled). The telltale is generally defined as a indicator positioned in the cluster 22 which includes a symbol (e.g., engine, seatbelt, low fuel, etc.) positioned thereon and configured to illuminate when predetermined conditions related to each of the engine, seatbelt and low fuel have been met. The signal BLT_STS generally corresponds to a restraint status signal in which one or more of the seatbelts may be unfastened or in an unbuckled state and the vehicle speed and the ignition status conditions have been met. In one example, the seatbelt status controller 40 may transmit an intermittent chime at 240 rep/min at a frequency of 740 Hz. The number or repetitions per minute and the frequency of the chime may vary based on the desired characteristics of a particular implementation.

The cluster 22 transmits the signal IGN_SW_STS to the seatbelt status controller 40 so that the seatbelt status controller 40 may assess the status of the ignition switch 34 (e.g., OFF, RUN, ACCY or START). An audio control module (ACM) 48 may be operably coupled to the cluster 22 via the multiplexed bus. The ACM 48 is adapted to generate audible signals for entertainment purposes. The ACM 48 may also be adapted to amplify voice commands in the event a cell phone is coupled to the ACM 48. In addition, the ACM 48 may be used in combination with a voice recognition session. The ACM 48 ceases to generate audible signals in response to the seatbelt status controller 40 determining that one or more seatbelts are not fastened, and the vehicle speed and ignition status conditions are met. The ACM 48 performs the mute operation in response to receiving the signal BLT_STATUS. The ACM 48 may not be in a muted state when used to facilitate a cell phone conversation or when used in connection with a voice recognition session in the event the seatbelts are disabled and the applicable vehicle criteria is met.

Conventional vehicles generally provide drivers with the ability to enable or disable the seatbelt status controller 40 in order to turn off/on the controller 40 as desired by the driver. By disabling the controller 40, the controller 40 may cease to audibly notify the driver and cease to transmit the signal BLT_STATUS to the cluster 22 for visually notifying the driver that the seatbelts are in unbuckled state. The system 20 provides the primary driver with the option of selectively enabling/disabling the operation of the controller 40, however, the system 20 may prevent the secondary driver from disabling the operation of the seatbelt status controller 40. The controller 40 receives the signal DRIVER_STATUS_1 to determine whether the driver is the primary driver or the secondary driver. The seatbelt status controller 40 is generally configured "ON" and provides audible notification and the cluster 22 is configured to visually present the safety belt unfastened message when the applicable vehicle criteria is met and in response to determining that the secondary driver is driving the vehicle. The functionality performed by the seatbelt status controller 40 may be incorporated into the cluster 22 or the SPDJB 32.

In one example, the cluster 22 may visually present the option of enabling/disabling the seatbelt status option via the message center display 24 and allow the primary driver to select a corresponding option via the message center switches 26. In such an example, the cluster 22 may transmit a control signal (not shown) to the seatbelt status controller 40 to enable/disable the seatbelt status operation. The cluster 22 on the other hand may not visually present such an option to the secondary driver in response to detecting that the driver of the vehicle is the secondary driver. In the event the driver of the vehicle is the secondary driver, the ACM 48 is muted in response to determining that the secondary driver is not fastened with a seatbelt and the applicable vehicle criteria is met. The muted characteristic of the ACM 48 may not be enabled/disabled by the secondary driver.

A forward collision warning (FCW) module 50 may be operably coupled to the cluster 22 and receive the signal DRIVER_STATUS_1 from the cluster 22. The FCW module 50 may be a portion of an active sensing system that is adapted to determine if the vehicle is in a state in which a frontal collision may be imminent. In such a case, the FCW module 50 may transmit a signal FCW to the cluster 22 in the event a forward collision is imminent. The FCW system generally includes a heads up display (HUD) which includes a bank of LEDs. The bank of LEDs is disposed about the windshield of the vehicle. The FCW module 50 is operably coupled to a radar system (not shown). The radar system detects the position of the object with respect to the vehicle. In the event an imminent collision is detected by the radar system, the radar system transmits a control signal (not shown) to the FCW module 50. The FCW module 50 illuminates the bank of LEDs to notify the occupants that a collision may be imminent. The FCW module 50 generally allows the driver to enable/disable the chime and/or the visual indicators as well as to adjust a particular sensitivity level.

The cluster 22 may also audibly and visually notify (via the message center display 24 (or telltale) and the chimes 28) the driver of the collision when the collision is imminent. An FCW switch 51 may be coupled to the FCW module 50 to enable/disable the FCW module 50 and control vehicle sensitivity. In addition the FCW feature may be enabled/disabled by the primary driver via the message center switches 26 in the cluster 22. In such an example, the cluster 22 may transmit a control signal (not shown) to the FCW module 50 to enable/disable the FCW feature. The primary driver is generally permitted to enable/disable the chime and/or visual indicator and adjust the sensitivity level of the FCW system. The secondary driver is prohibited from disabling the FCW feature in the event the secondary driver is detected to be the driver of the vehicle. For example, the cluster 22 may not present the enable/disable prompt to the secondary driver via the cluster 22 to allow the secondary driver to disable FCW. The cluster 22 is configured to allow the secondary driver to adjust vehicle sensitivity for determining the particular moment in which the FCW warning is to be issued. The secondary driver may increase/decrease sensitivity to trigger the FCW earlier/later based on the selected sensitivity level. The secondary driver is prohibited from enabling/disabling the visual and/or audible warning mechanism of the FCW.

A fuel level sensor 52 may be operably coupled to the cluster 22 for transmitting information with respect to the amount of fuel (or the fuel level) in the fuel tank of the vehicle. The cluster 22 may visually present a low fuel warning via the message center display 24 or with a telltale (not shown). The cluster 22 is adapted to calculate the amount of fuel based on the fuel level information provided by the fuel level sensor 52. In one example, the cluster 22 is generally adapted to present the low fuel warning when the fuel level is less than or equal to a standard Distance-To-Empty (DTE). The DTE is defined as the distance in miles or kilometers from the moment to when the fuel tank may be empty. The DTE value may be varied based on who the particular driver (e.g., primary or secondary) of the vehicle is. In one example, the standard DTE for the primary driver may be in a range of between one to sixty miles from the moment in which the fuel tank may be empty.

The strategy for triggering the low fuel warning may be altered in the event the cluster 22 determines that the vehicle is being driven by the secondary driver. For example, the low fuel warning may be issued when the fuel level is less than or equal to the standard DTE multiplied by a predetermined value. In one example, the predetermined value may be set to one and a half while the DTE is at fifty miles. In such a case, the cluster 22 may issue the low fuel warning earlier (e.g., at seventy five miles before the fuel tank is empty) when compared to the point in which the low fuel warning is issued for the primary driver. In general, the system 20 is adapted to provide for the low fuel warning at an earlier point in time when the driver of the vehicle is detected to be the secondary driver. It should be noted that the low fuel level strategy may be implemented for any type of low fluid warning detection configuration in the vehicle. Such a low fluid warning detection configuration may apply to windshield wiper fluid, oil and/or transmission fluid.

An ESC module 54 may be operably coupled to the cluster 22. The ESC module 54 is adapted to control the operation of various electronic stability control (ESC) systems, such as traction control (TC), yaw stability control (YSC) and rollover stability control (RSC). The ESC module 54 may include a TC controller (not shown), a YSC controller (not shown) and a RSC controller (not shown). The TC controller generally reduces power to drive wheels of the vehicle in order to minimize wheel-spin and maximize traction. The YSC controller generally controls the vehicle's motion of rotation about a vertical axis. The RSC controller generally controls the motion of the vehicle by selectively applying brakes and controlling the speed of the vehicle to prevent the vehicle from rolling over.

An ESC control switch 56 may be operably coupled directly to the ESC module 54 or directly to the cluster 22. The ESC control switch 56 generally allows the driver the ability to enable/disable the one or more ESC operations in the event one or more of the ESC operations are not needed. For example, the ESC control switch 56 may allow the driver the ability to disable the traction control system due to various road conditions, such as snow, dirt, ice, etc. The ESC module 54 is configured to present a signal ESC_STATUS to the cluster 22 so that the cluster 22 can display the current state of ESC systems (e.g., TC, YSC and RSC). In the event the ESC control switch 56 is coupled to the cluster 22, the cluster 22 transmits a signal ESC_CONTROL to the ESC module 54 to enable/disable the ESC operations. The message center switch 26 may also be used by the driver to enable/disable the ESC operation without the need for the ESC switch 56. In such a case, the cluster 22 transmits the signal ESC_CONTROL to the ESC module 54 to enable/disable the ESC operation.

The ESC module 54 is adapted to receive the signal DRIVER_STATUS from the cluster 22 to determine if the driver of the vehicle is the primary or the secondary driver. The ESC module 54 is configured to prevent the secondary driver from disabling any one or more of the ESC operations. For example, the primary driver may desire to prevent the secondary driver from disabling the traction control operation for safety reasons. Such a condition may prevent the secondary driver from spinning or burning the tires and/or drifting when the traction control is disabled. In the event the driver of the vehicle is the secondary driver, the cluster 22 may not present a message in the message center display 24 to the secondary driver to allow the secondary driver to disable the ESC operations. In the event the secondary driver attempts to disable any one or more of the ESC features, the cluster 22 may display an ESC driver status message.

The primary driver may allow the secondary driver to enable/disable the operation of the traction control in the event it may be likely that the secondary driver may experience road conditions that may require disabling traction control. For example, due to various weather conditions or road conditions, the primary driver may configure the ESC module 54 via the cluster 22 to allow the secondary driver to disable the traction control. For example, the message center display 24 may provide for an inhibit traction control message which allows the primary driver the option of either allowing the secondary driver the ability to enable/disable traction control or to inhibit enabling/disabling the traction control.

In the event the primary driver intends to allow the secondary driver to enable/disable the traction control, the primary driver may simply choose not to select the inhibit traction control option with the message center switches 26. No action is required by the primary driver in this case. In the event the primary driver intends to inhibit the traction control disable feature for the secondary driver (e.g., prevent the secondary driver from either enabling/disabling the traction control feature), the primary driver may select the inhibit feature via the message control switches 26 thereby precluding the secondary driver from enabling/disabling the traction control feature. The cluster 22 may transmit the signal ESC_CONTROL to the ESC module 54 (e.g., if the ESC control switch 56 is coupled to the cluster 22) which is indicative of whether the secondary driver can enable/disable the one or more ESC operations or whether the secondary driver is precluded from enabling/disabling the traction feature.

A parking aid module 58 may be operably coupled to the cluster 22. The parking aid module 58 is adapted to provide a warning to the driver in the event the front or rear portions of the vehicle comes too close to an object while the vehicle is being parked. The parking aid module 58 includes a sounder for audibly warning the driver in the event front or rear portions of the vehicle comes too close to an object while the vehicle is being parked. The sounder will be discussed in more detail in connection with the blind spot monitoring and cross-traffic alert operations. In one example, a park aid switch 59 may be coupled to the parking aid module 58 and enable/disable the park aid feature. In another example, the driver may use the message center switches 26 to enable/disable the park aid feature. In another implementation the parking aid module 58 may be integrated into an auto park module 60. The auto park module 60 may be coupled to cluster 22. The auto park module 60 is generally configured to automatically park the vehicle for the driver. For example, in a parallel parking situation, the driver may give control over the vehicle to the auto park module 60 and allow the vehicle to park itself. An auto park switch 62 is coupled to the auto park module 60 for controlling the operation of the auto park switch 62.

The operation of the park aid feature may be enabled/disabled based on the status of the driver. The primary driver is free to enable/disable the operation of the park aid feature as desired. The primary driver may prevent the secondary driver from disabling the park aid feature. The parking aid module 58 is adapted to receive the signal DRIVER_STATUS_1 from the cluster 22 to determine if the driver of the vehicle is the primary or the secondary driver. In the event the driver of the vehicle is determined to be the primary driver, the cluster 22 may allow the primary driver to enable/disable the park aid operation via the park aid switch 59. In one example, the primary driver may view the enable/disable park aid option via the message center display 24 and select the enable/disable option via the message center switches 26. In such an example, the cluster 22 may transmit a control signal (not shown) to the parking aid module 58 to enable/disable the park aid feature.

In the event the driver is the secondary driver, the cluster 22 inhibits the park aid disable option and prevents the secondary driver from viewing the enable/disable park aid option in the message center display 24. In the auto park module 60 implementation, the cluster 22 may be adapted to transmit the signal DRIVER_STATUS_1 to the auto park module 60 to determine whether the driver is the primary or the secondary driver.

A powertrain control module (PCM) 68 (and/or anti-locking braking system (ABS) module) is operably coupled to the cluster 22. The PCM 68 is generally configured to transmit a signal VEH_SPEED which corresponds to the speed of the vehicle. The PCM 68 may directly compute the vehicle speed for the vehicle or may receive the vehicle speed from the ABS module (or other braking module). Likewise, the cluster 22 may optionally receive the signal VEH_SPEED directly from the braking module. The PCM 68 (or transmission controller (not shown) may transmit a signal TRANS_STATUS to the cluster 22. The signal TRANS_STATUS generally corresponds to state of the transmission for the vehicle. For example, the signal TRANS_STATUS may correspond to the vehicle having the following transmission positions: Park (P), Reverse (R), Neutral (N), Drive (D), and Low (L).

A blind spot monitoring (BSM) and cross traffic alert (CTA) module 70 is operably coupled to the cluster 22. While FIG. 1 generally illustrates that the BSM/CTA module 70 is a single control module, it is generally contemplated that the BSM/CTA module 70 may be separated into two or more modules whereby one such module is positioned on the right side of the vehicle and the other module is positioned on the left side of the vehicle. Each BSM/CTA module 70 may include one or more radars that use radio waves to find the distance and location of objects in relation to the vehicle. Such radars are known in the art and will not be discussed further.

The blind spot monitoring operation performed by the BSM/CTA module 70 generally assists the driver in assessing whether a vehicle is in or may be entering an area (or detection zone) to either side (e.g., left and right side) of the vehicle. The detection zone that is monitored by the BSM/CTA module 70 while performing the blind spot monitoring operation is generally defined as the area extending rearward from outside mirrors of the vehicle to a minimum of at least three meters from beyond a bumper of the vehicle. The detection zone may extend up to 1.5 lanes from either the right or left side of the vehicle. The BSM/CTA module 70 may provide an alert for the driver when a target vehicle is overtaking the subject vehicle (i.e., the vehicle referenced to include the BSM/CTA module 70) or is stagnating within the detection zone.

At least one lighting device 72 is operably coupled to the BSM/CTA module 70 to provide a visual alert to the driver in the event the BSM/CTA module 70 detects the presence of the target vehicle in the detection zone. In one example, the lighting device 72 may be positioned on at least one outside mirror of the vehicle. In yet another example, the lighting device 72 may be positioned on a trim piece located on an A-pillar of the vehicle or on a sail trim piece within the vehicle. The particular location of the lighting device 72 may vary based on the desired criteria of a particular implementation so long as the lighting device 72 is visible to the driver of the vehicle. The lighting device 72 may comprise an LED or other suitable device that is generally situated to illuminate or generate light signals. In another example, the BSM/CTA module 70 may control an intermediate module (not shown). The lighting device 72 may be operably coupled to the intermediate module such that the intermediate module turns on the lighting device 72 in response to control signals from the BSM/CTA module 70.

In one example, the BSM/CTA module 70 may control the lighting device 72 so that the light is turned on and remains on for the duration in which the target vehicle is detected to be in the detection zone. The cluster 22 may transmit the signal TURN_INDICATOR to the BSM/CTA module 70. The signal TURN_INDICATOR generally corresponds to the state of the turn signals (e.g., on/off). In the event the BSM/CTA module 70 determines that the target vehicle is within the detection zone, the BSM/CTA module 70 controls the lighting device 72 to turn on and the BSM/CTA module 70 transmits a signal ALERT_1 to the park aid module 58. The park aid module 58 may trigger the sounder to generate an audible signal to provide a heightened alert to the driver while attempting to make a lane change and while the target vehicle is detected to be in the detection zone. In yet another example, the BSM/CTA module 70 transmits a signal ALERT_2 to the cluster 22 in the event the target vehicle is within the detection zone. The cluster 22 may trigger the chime 28 to generate the audible signal. The audible feature may be disabled by the primary driver via the cluster 22. In the event the audible feature is disabled by the primary driver, the BSM/CTA module 70 may continue to control the light indicator 72 to remain on while the target vehicle is detected in the detection zone.

The cluster 22 may allow the driver of the vehicle to disable the entire blind spot monitoring operation in the event the driver of the vehicle is the primary driver (i.e., if the primary driver desires to do so). For example, the cluster 22 may transmit a signal CTRL to the BSM/CTA module 70 which is indicative of whether the BSM feature is enabled or disabled. In the event the primary driver enables the BSM feature, the cluster 22 transmits the signal CTRL which indicates that the BSM operation is enabled to the BSM/CTA module 70. In one example, the BSM/CTA module 70 may default to an enabled state in response to the driver starting the vehicle.

The cluster 22 may not allow the secondary driver to disable the blind spot monitoring operation (e.g., inhibit BSM disable). In response to the cluster 22 determining that the driver of the vehicle is the secondary driver via the signal DRIVER_STATUS_1, the cluster 22 may not present any such disable options to the secondary driver via the display 24 to allow the secondary driver to turn off the BSM feature. In addition, the cluster 22 may not allow the secondary driver to disable the audible feature (e.g., generating the audible signals with the sounder of the parking aid module 58 or with the chime 28 of the cluster 22 along with the illumination signals generated by the light indicator 72 in the event the target vehicle is detected to be in the detection zone and the subject vehicle is undergoing a lane change). The cluster 22 transmits the signal CTRL to the BSM/CTA module 70 which indicates that the BSM operation is enabled in response to determining that the signal DRIVER_STATUS_1 corresponds to the secondary driver.

The cluster 22 may transmit the signal VEH_SPEED to the BSM/CTA module 70 so that the BSM/CTA module 70 can compare the subject vehicle speed to the speed detected by the radars of the target vehicle to determine whether the target vehicle is overtaking the subject vehicle or whether the subject vehicle is overtaking the target vehicle. It is generally contemplated that the BSM/CTA module 70 may generate an alert in the event the target vehicle overtakes the subject vehicle. The BSM/CTA module 70 may not generate an alert in the event the subject vehicle overtakes the target vehicle. In general, the BSM/CTA module 70 while performing blind spot monitoring operation may operate in the event the speed of the subject vehicle decreases all the way down to zero kph.

The BSM/CTA module 70 may also perform cross-traffic alert. The cross-traffic alert operation performed by the BSM/CTA module 70 generates an alert for the driver in the event the subject vehicle is backing out of a parking spot and the radar sensors within the BSM/CTA module 70 detects that on-coming traffic is within the detection zone of the subject vehicle. The BSM/CTA module 70 generally monitors vehicle speed and transmission status in order to perform the CTA operation. In one example, a threshold speed of 3 kph or above and the transmission may be in the reverse state to perform the CTA operation. The particular speed of the vehicle used to perform the CTA operation may vary based on the desired criteria of a particular implementation.

In the event the BSM/CTA module 70 detects that the target vehicle is approaching the subject vehicle (and is within the detection zone), the BSM/CTA module 70 may control the light indicator 72 to generate a flashing light, may transmit the signal ALERT_1 to the parking aid module 58 to control the sounder of the parking aid module 58 to generate audible signals, and may transmit a signal ALERT_2 to the cluster 22 so that the cluster 22 displays a text message in the display 24 to notify the driver that the target vehicle is approaching the subject vehicle and that the target vehicle is within the detection zone. Any one or more of the above responses may be executed in the event the BSM/CTA module 70 detects the presence of the target vehicle in the detection zone.

The cluster 22 may allow the primary driver to disable the CTA operation via the switches 26 in the cluster 22. The primary driver may be given a first prompt to disable the BSM operation and a second prompt to disable the CTA operation. Optionally, the cluster 22 may be configured such that a single prompt is given to the primary driver to disable both the BSM and the CTA operation. The cluster 22 also transmits the signal CTRL to enable/disable the CTA operation in the event the driver of the vehicle is the primary driver. In general, the signal CTRL may comprise a single message that includes data for enabling/disabling the BSM operation along with data for enabling/disabling the CTA operation. The cluster 22 may not allow the secondary driver to disable the CTA operation. In general, the cluster 22 may mask any such prompts related to enabling/disabling the CTA operation in response to determining that the driver of the vehicle is the secondary driver.

Figure 2:
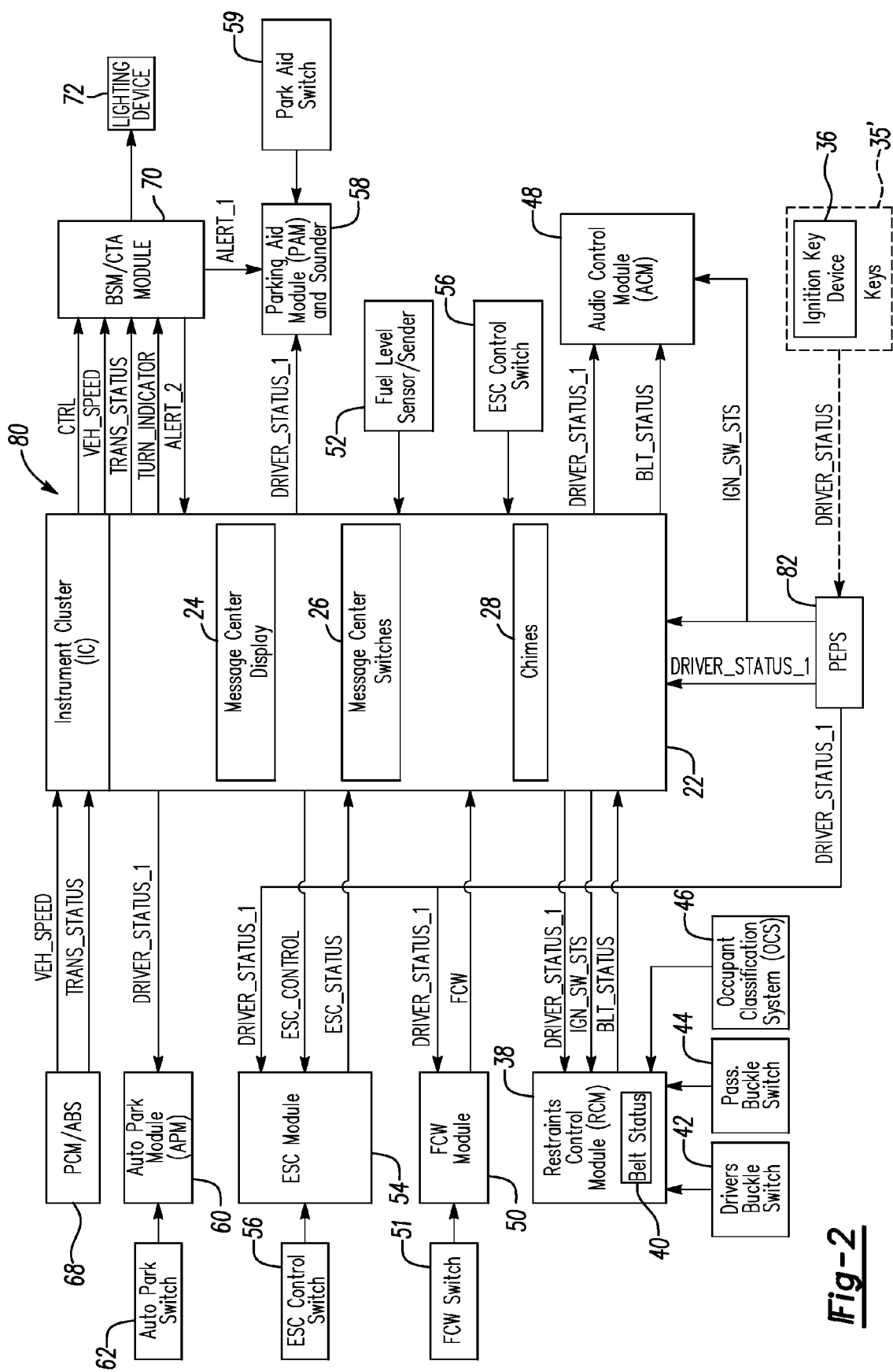
FIG. 2 depicts another system for differentiating between primary and secondary drivers of a vehicle and for controlling the operation of various vehicle features based on the status of the driver in accordance to another embodiment of the present invention.

FIG. 2 depicts a system 80 for differentiating between primary and secondary drivers and for controlling the operation of various vehicle features based on the status of the driver in accordance to another embodiment of the present invention. A passive entry passive start (PEPS) controller 82 may be operably coupled to the cluster 22. The PEPS controller 82 may be used in place of the PATS controller 30 as illustrated in FIG. 1. While FIG. 2 generally illustrates that the PEPS controller 82 is positioned external to the cluster 22, additional implementations may include positioning the PEPS controller 82 within the cluster 22. The particular placement of the PEPS controller 82 with respect to the cluster 22 may vary based on the desired criteria of a particular implementation.

In general, the PEPS function is a keyless access and start system. The driver may carry one or more keys 35' that may be in the form of an electronic transmission device. The keys 35' each include the ignition key device 36 embedded within for communicating with the PEPS controller 82. The transponder of the ignition key device 36 is adapted to send the RFID tags as the signal DRIVER STATUS to the PEPS controller 82. To gain access or entry into the vehicle with the keys 35' in the PEPS implementation, the driver may need to wake up the PEPS controller 82 to establish bi-directional communication between the keys 35' and the PEPS controller 82. In one example, such a wake up may occur by requiring the driver to touch and/or pull the door handle of the vehicle. In response to the door handle being toggled or touched, the PEPS controller 82 may wake up and transmit RF based signals to the keys. The PEPS controller 82 and the keys 35' may undergo a series of communications back and forth to each other (e.g., handshaking) for vehicle access authentication purposes. The PEPS controller 82 may unlock the doors in response to a successful completion of the handshaking process. Once the driver is in the vehicle, the driver may simply press a button positioned on an instrument panel to start the vehicle.

In one example, the system 80 may be adapted to tag or associate the keys as either a primary or a secondary key during a learn operation as discussed with the PATS controller 30. In yet another example, the system 80 may be configured to associate the keys as primary or secondary keys in the manner identified and disclosed in U.S. Pat. Ser. No. 12/139,005, entitled "SYSTEM AND METHOD FOR PROGRAMMING KEYS TO ESTABLISH PRIMARY AND SECONDARY DRIVERS" and filed on Jun. 13, 2008, as noted above. As noted in connection with FIG. 1, while learning the keys to the vehicle during vehicle assembly or during repair, the keys 35' may be tagged as a primary key or a secondary key based on the sequential order in which the keys 35' are learned to the vehicle. For example, the PEPS controller 82 may assign the first key 35' that is learned to the vehicle as the primary key and the second key 35' that is learned to the vehicle as the secondary key. During vehicle startup, the keys 35' each transmit a corresponding RFID tag having hexidecimal-based data on the signal DRIVER_STATUS to the PEPS controller 82. The PEPS controller 82 may compare the hex data in the RFID tag to predetermined hex data in a lookup table of the PATS controller 30 to determine if a match occurs. If a match occurs, the PEPS controller 82 may allow the engine to start in the event the driver intends to start the vehicle.

In addition to the learn operation as discussed immediately above, the system 80 may tag or associate the keys by providing predetermined hex data in the RFID tag which corresponds to whether the key is a primary key or a secondary key as noted in connection with the PATS controller 30. The PEPS controller 82 receives the predetermined hex in the RFID tag and determines whether the key is a primary or a secondary key based on the predetermined hex data in the RFID tag.

Any number of additional keys may be tagged as either the primary or secondary key. For example, a plurality of replacement or spare keys may be learned to the vehicle and designated as either a primary or a secondary key. The PEPS controller 82 is adapted to provide the signal DRIVER_STATUS_1 to the various controllers over the multiplexed bus. The signal DRIVER_STATUS_1 corresponds to whether the driver is the primary driver or the secondary driver. The PEPS controller 82 may also transmit the signal IGN_SW_STS to the cluster 22. The PEPS controller 82 determines that the key ignition status is in the run position in response to the driver toggling the brake pedal and depressing the start switch. In such a case, the vehicle is started and the PEPS controller 82 transmits the signal IGN_SW_STS as being in the run state. In the event the driver selects only the start button, the PEPS controller 82 transmits the signal IGN_SW_STS as being in the accessory state.

Figure 3:
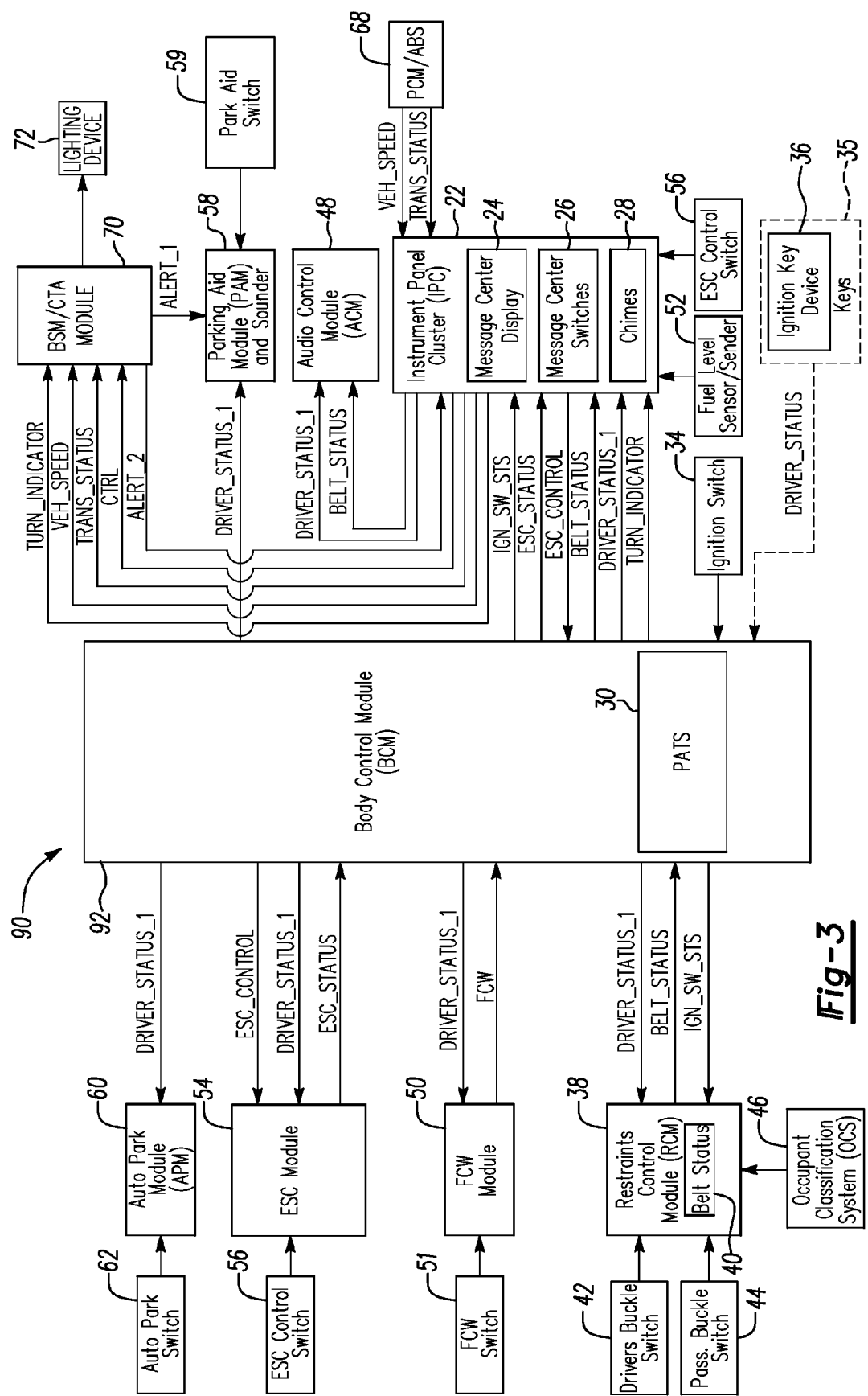
FIG. 3 depicts another system for differentiating between primary and secondary drivers of a vehicle and for controlling the operation of various vehicle features based on the status of the driver in accordance to another embodiment of the present invention.

FIG. 3 depicts another system 90 for differentiating between primary and secondary drivers of a vehicle and for controlling the operation of various vehicle features based on the status of the driver in accordance to another embodiment of the present invention. A body control module (BCM) 92 may be operably coupled to the cluster 22. The BCM 92 may be adapted to perform a number of interior body electrically based functions. For example, the BCM 92 may perform interior locking, remote keyless entry (RKE), interior/exterior lighting, wiper control (front and/or rear) and other such suitable functionality that is generally attributed to the interior electronics of the vehicle. In one example, the BCM 92 may transmit the signal TURN_INDICATOR directly to the BSM/CTA module 70 and the cluster 22. In another example, the cluster 22 may transmit the signal TURN_INDICATOR to the BSM/CTA module 70 in response to receiving such signal from the BCM 92.

The PATS controller 30 may be positioned within the BCM 92. While FIG. 3 generally illustrates that the PATS controller 30 is positioned within the BCM 92, the PATS controller 30 may be positioned in the cluster 22 or any other controller or module shown in FIG. 3. In addition, the PATS controller 30 may be implemented as a standalone unit. The particular placement of the PATS controller 30 may be varied to meet the design criteria of a particular implementation. The PATS controller 30 may be coupled directly to the ignition switch 34. The BCM 92 may transmit the signal IGN_SW_STS to the cluster 22 via the multiplexed bus. The BCM 92 may transmit and receive all signals as illustrated in FIG. 3 via the multiplexed bus. Additionally, the cluster 22 may transmit and receive all signals as illustrated in FIG. 3 via the multiplexed bus. The BCM 92 may be adapted to transmit the signal DRIVER_STATUS_1 to the cluster 22, the restraint control module 38, the seatbelt status controller 40, the audio control module 48, the ESC module 54, the parking aid module 58, the auto park module 60, and/or the APIM 70. The cluster 22 inhibits FCW disable, the park aid disable, ESC disable, BSM disable, CTA disable and provides for the early low fuel warning in response to the signal DRIVER_STATUS_1 indicating that the secondary driver is driving the vehicle. The seatbelt status controller 40 may inhibit the seatbelt status operation and prevent the secondary driver from disabling the operation in the event the secondary driver is determined to be the driver of the vehicle.

Figure 4:
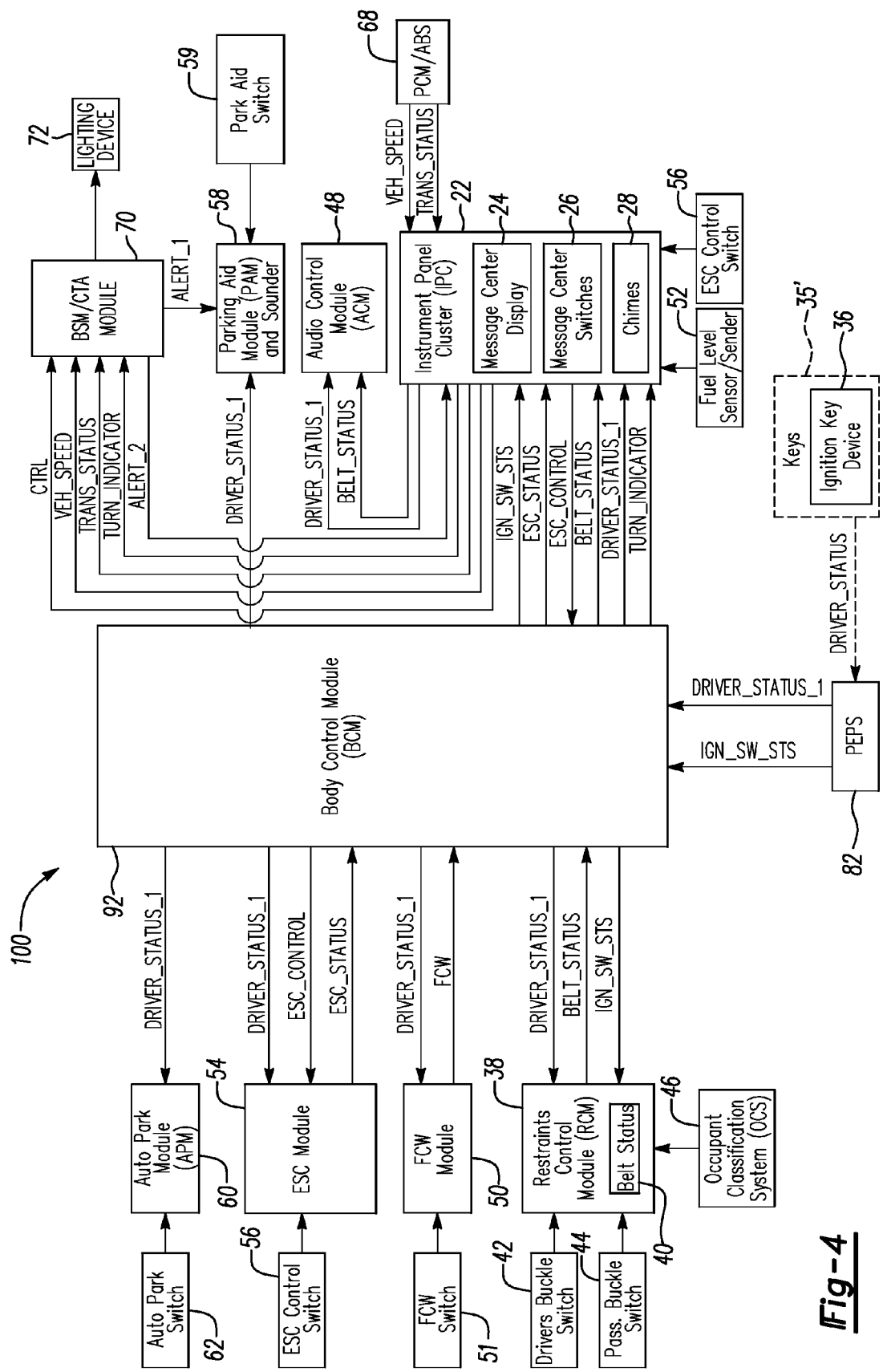
FIG. 4 depicts another system for differentiating between primary and secondary drivers of a vehicle and for controlling the operation of various vehicle features based on the status of the driver in accordance to another embodiment of the present invention.

FIG. 4 depicts another system 100 for differentiating between primary and secondary drivers of a vehicle and for controlling the operation of various vehicle features based on the status of the driver in accordance to another embodiment of the present invention. The PEPS controller 82 may be operably coupled to the BCM 92. The PEPS controller 82 may transmit the signals IGN_SW_STS and DRIVER_STATUS to the BCM 92. While FIG. 4 generally illustrates that the PEPS controller 82 is positioned external to the BCM 92, the PEPS controller 82 may be integrated into the BCM 92 or any other controller (or module) shown. The particular placement of the PEPS controller 82 may vary to meet the desired criteria of a particular implementation. As noted in FIG. 3, the BCM 92 may be adapted to transmit the signal DRIVER_STATUS_1 to the cluster 22, the restraint control module 38, the seatbelt status controller 40, the audio control module 48, the ESC module 54, the parking aid module 58, and/or the auto park module 60. The cluster 22 inhibits FCW disable, the park aid disable, ESC disable, BSM disable, CTA disable, and provides for the early low fuel warning in response to the signal DRIVER_STATUS_1 indicating that the secondary driver is driving the vehicle. The seatbelt status controller 40 may inhibit the seatbelt status operation and prevent the secondary driver from disabling the operation in the event the secondary driver is determined to be the driver of the vehicle.

Figure 5:
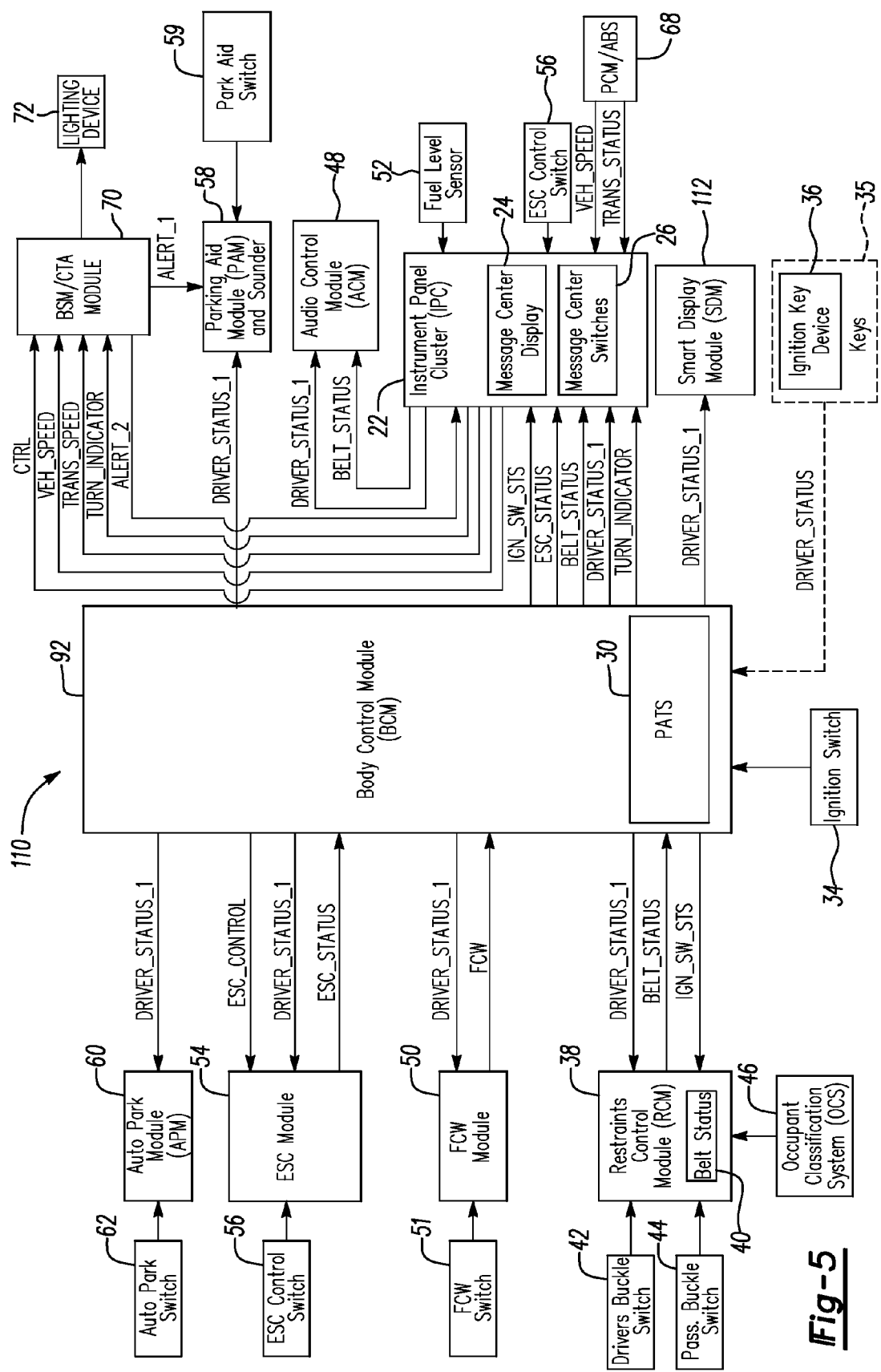
FIG. 5 depicts another system for differentiating between primary and secondary drivers of a vehicle and for controlling the operation of various vehicle features based on the status of the driver in accordance to another embodiment of the present invention.

FIG. 5 depicts another system 110 for differentiating between primary and secondary drivers of a vehicle and for controlling the operation of various vehicle features based on the status of the driver in accordance to another embodiment of the present invention. A smart display module 112 may be operably coupled to the cluster 22 and the BCM 92. The smart display module (SDM) 112 may be implemented as a monitor having a screen. The SDM 112 may visually present messages to the driver. In addition, a driver may touch different fields on the screen of the SDM 112 to select options for different vehicle related features. In one example, the message center switches 26 of the cluster 22 may be replaced by the SDM 112. The SDM 112 may be implemented separately from the cluster 22. The SDM 112 may be packaged in a center stack area of the instrument panel above the audio control module 48 and a climate control module (not shown). The SDM 112 may provide and is not limited to the following: allowing the driver to enable/disable default and configurable settings such as enabling/disabling the seatbelt status, enabling/disabling the parking aid, and enabling/disabling one or more of the ESC features, enabling/disabling the BSM operation, and enabling/disabling the CTA operation. While not shown, the SDM 112 may transmit control signals (not shown) to the seatbelt status controller 40, the parking aid module 58 and the ESC module 54. The SDM 112 may also allow the driver to select various administrative menu options and save administrative settings which relate to the driver status functionality. The SDM 112 may not require for the user to have to toggle through a plurality of options to select a particular option as may be necessary with the message center switches 26 of the message center. The SDM 112 may also display a driver status message during vehicle start up and a seatbelt warning message. In one example, the SDM 112 may be configured to display any messages traditionally displayed by the message center display 24. In another example, the message center display 24 may be implemented along with the SDM 112.

The BCM 92 may provide the signal DRIVER_STATUS_1 to the SDM 112. In the event the signal DRIVER_STATUS_1 corresponds to the primary driver, the cluster 22 and/or the SDM 112 may allow the primary driver to enable/disable ESC, FCW, parking aid, BSM operation, and CTA operation. The cluster 22 may use the signal DRIVER_STATUS_1 to maintain the normal low fuel warning strategy in the event the signal DRIVER_STATUS_1 corresponds to the primary driver. In the event the signal DRIVER_STATUS_1 corresponds to the secondary driver, the SDM 112 may not allow the secondary driver to modify or change the seatbelt status disable, TC disable, ESC disable, FCW disable, the BSM disable, the CTA disable, and park aid disable. The cluster 22 may change the strategy with respect to issuing the low fuel warning strategy at an earlier point in time if the signal DRIVER_STATUS corresponds to the secondary driver.

Figure 6:
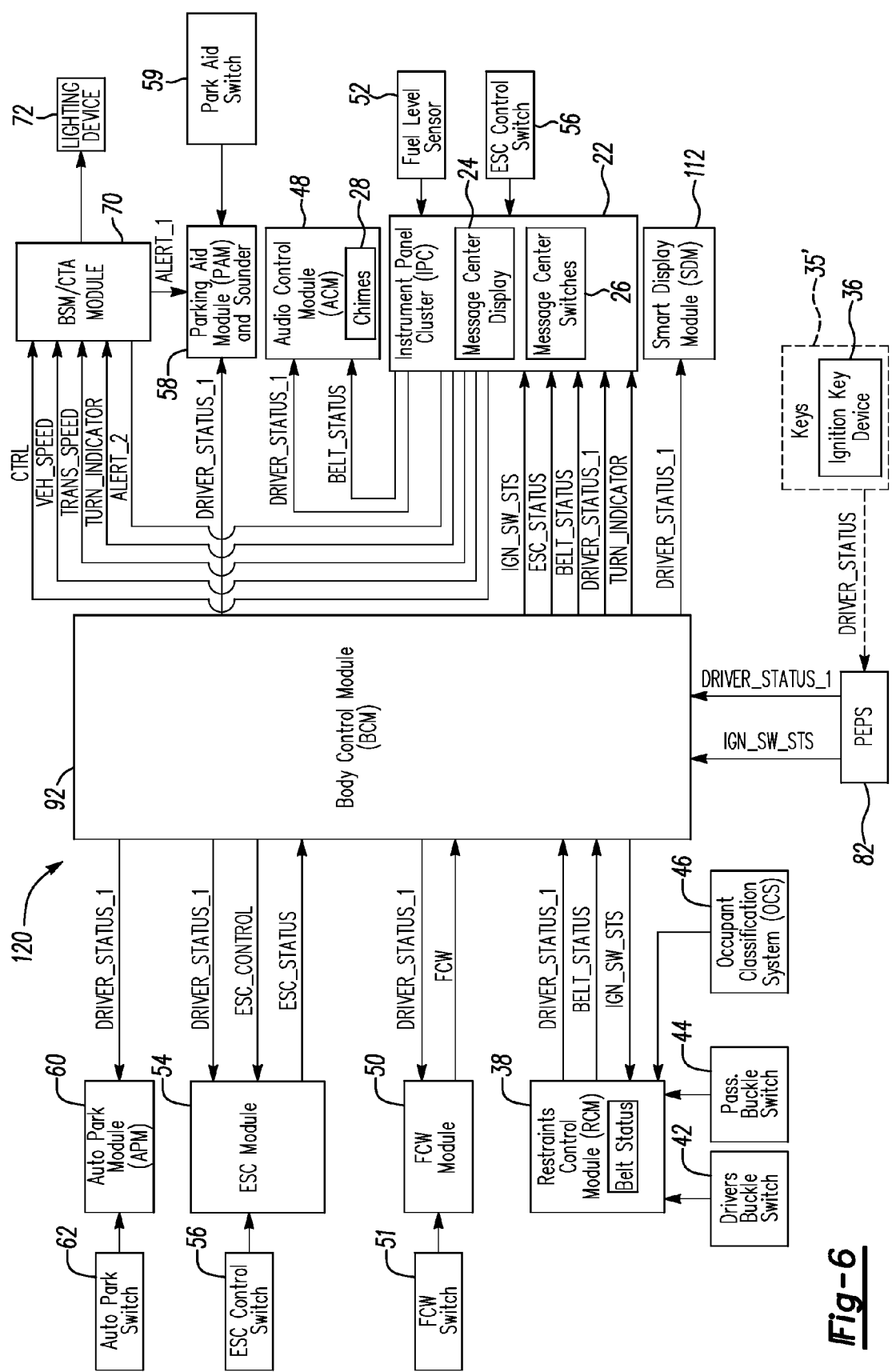
FIG. 6 depicts another system for differentiating between primary and secondary drivers of a vehicle and for controlling the operation of various vehicle features based on the status of the driver in accordance to another embodiment of the present invention.

FIG. 6 depicts another system 120 for differentiating between primary and secondary drivers of a vehicle and for controlling the operation of various vehicle features based on the status of the driver in accordance to another embodiment of the present invention. The system 120 is similar to the system 110 with the exception of the PEPS controller 82 being implemented in place of the PATS controller 30. While FIG. 6 generally illustrates that the PEPS controller 82 is implemented as a standalone controller, the PEPS controller 82 may be implemented into any of the controllers or modules shown.

The PEPS controller 82 may determine the driver status in response to the signal DRIVER_STATUS transmitted from the ignition key device 36 and transmit the signal DRIVER_STATUS_1 to the BCM 92. The BCM 92 transmits the signal DRIVER_STATUS_1 to the SDM 112. The SDM 112 and/or the cluster 22 may allow the primary driver to enable/disable ESC, FCW, BSM, CTA, and parking aid feature. The cluster 22 may use the DRIVER_STATUS_1 to maintain the normal low fuel warning strategy in the event the signal DRIVER_STATUS_1 corresponds to the primary driver. In the event the signal DRIVER_STATUS_1 corresponds to the secondary driver, the SDM 112 may not allow the secondary driver to inhibit the seatbelt status disable, ESC disable, FCW disable, BSM disable, CTA disable and park aid disable. In addition, the cluster 22 may change the strategy with respect to issuing the low fuel warning strategy at an earlier point in time if the signal DRIVER_STATUS corresponds to the secondary driver.

Figure 7:
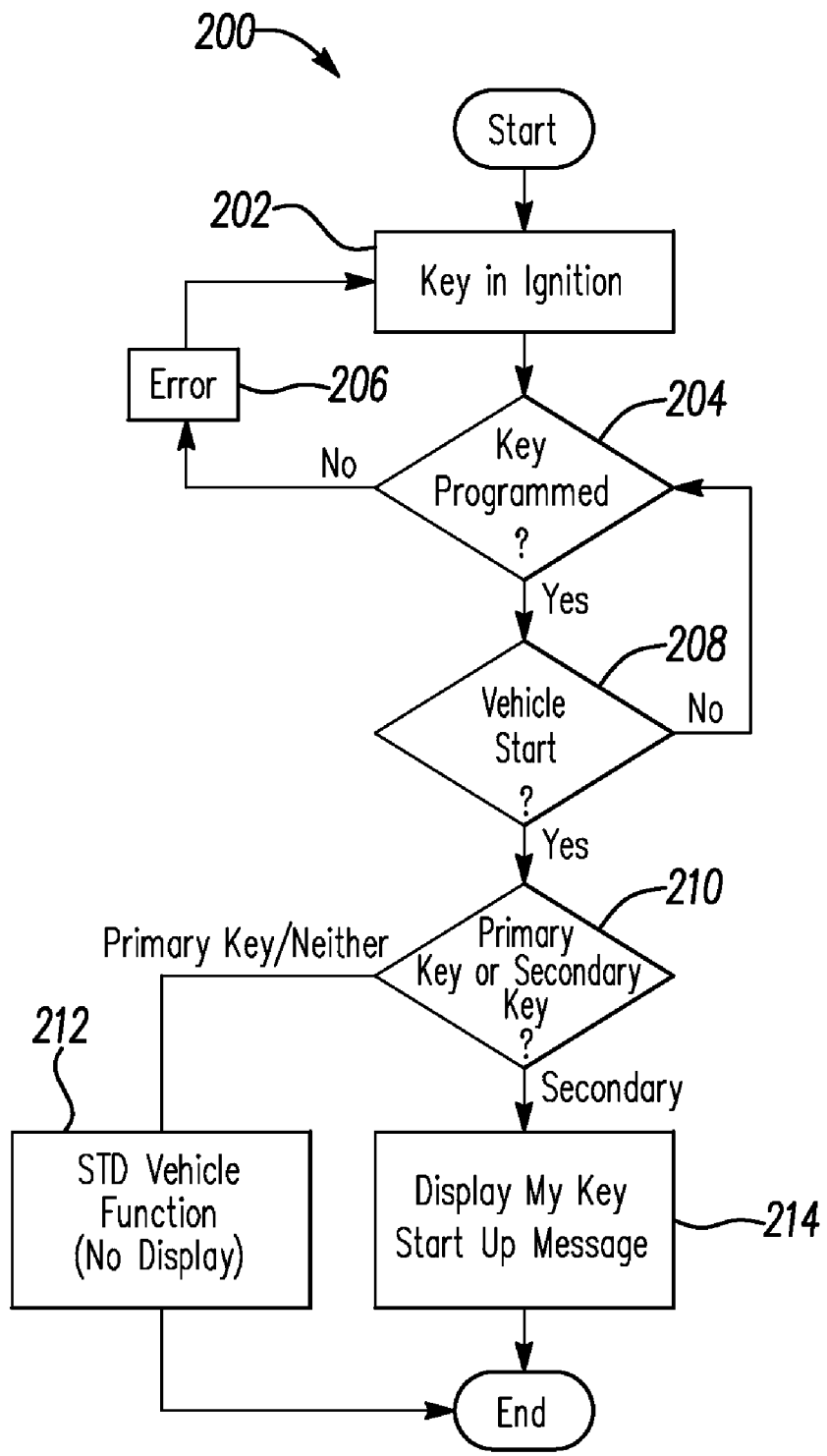
FIG. 7 depicts a method for displaying a message for notifying drivers when the vehicle is in a driver identification mode.

FIG. 7 depicts a method 200 for displaying a message to notify drivers of the driver status mode in accordance to one embodiment of the present invention. In block 202, the driver inserts the key into the ignition. For systems 20, 90 and 110, the key ignition switch 34 transmits the signal IGN_SW_STS to the SPDJB 32 or the BCM 92 (see FIGS. 1, 3, and 5). The SPDJB 32 or the BCM 92 transmits a multiplexed message of the signal IGN_SW_STS over the multiplexed bus. For systems 80, 100 and 120, the PEPS controller 82 transmits the signal IGN_SW_STS over the multiplexed bus to the various controllers or modules (see FIGS. 2, 4, and 6).

In block 204, the keys are monitored to determine if the keys were programmed. The PATS controller 30 or the PEPS controller 82 is adapted to determine if the keys are properly programmed so that the vehicle can be started. The PATS controller 30 or the PEPS controller 82 is also adapted to determine if the keys correspond to either the primary or secondary driver. In the event the keys are not properly programmed to start the vehicle, then the method 200 moves to block 206. In the event the keys are properly programmed to start the vehicle, then the method 200 moves to block 208.

In block 206, an error is detected. The PATS controller 30 or the PEPS controller 82 determines an error and may not allow the driver to start the vehicle.

In block 208, a vehicle start is monitored. For the systems 20, 90 and 110, the SPDJB 32 or the BCM 92 determines whether the ignition switch 34 is in the start position. For systems 80, 100 and 120, the PEPS controller 82 determines whether the vehicle is started. If the vehicle is started, then the method 200 moves to block 210. If the vehicle has not been started, then the method moves back to block 204.

In block 210, the cluster 22 determines if the key was programmed as a primary key for the primary driver or if the key was programmed as a secondary key for the secondary driver. If the key is determined to be a primary key, then the method 200 moves to block 212. If the key is determined to be a secondary key, then the method 200 moves to block 214. In the event the key is not programmed as a primary or secondary key, the method 200 moves to block 212.

In block 212, the vehicle resumes standard vehicle function and no display regarding driver status is presented to the driver.

In block 214, a driver status message is presented to the driver. For systems 20, 80, 90 and 100, the message center display 24 of the cluster 22 displays the driver status message to the primary or secondary drivers. For systems 110 and 120, the SDM 112 displays the driver status startup message to the primary or secondary drivers. In general, the driver status message may be useful in the situation whereby the primary driver accidentally uses the secondary key to start the vehicle. In such an example, a driver status message may be presented thereby notifying the primary driver that the vehicle may have limited override capability with respect to enabling and disabling the vehicle features of the vehicle.

Figure 8:
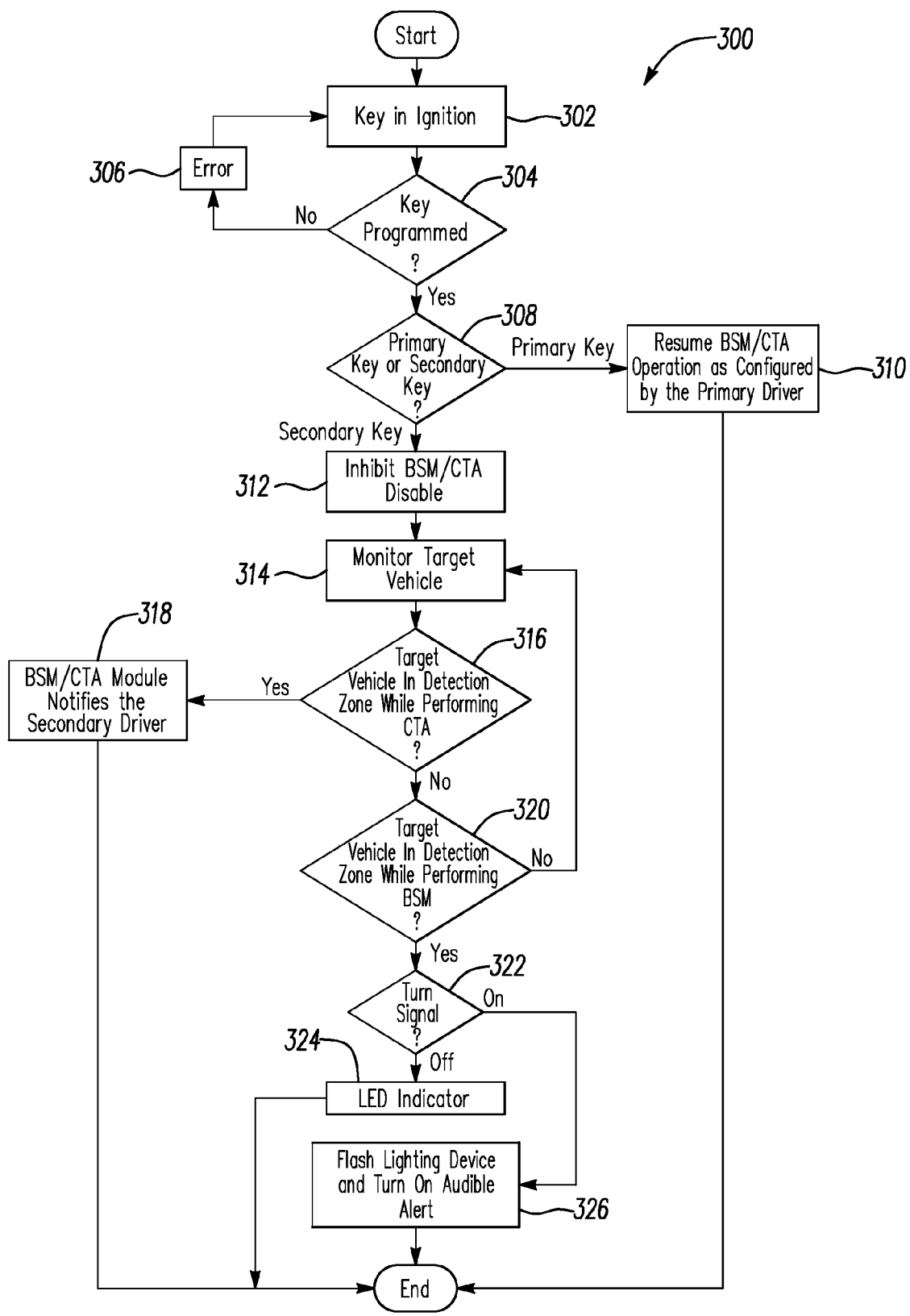
FIG. 8 depicts a method for controlling blind spot monitoring and cross traffic alert based on driver status in accordance to one embodiment of the present invention.

FIG. 8 depicts a method 300 for controlling BSM and CTA based on driver status in accordance to one embodiment of the present invention. In block 302, the driver inserts the key into the ignition. For systems 20, 90 and 110, the key ignition switch 34 transmits the signal IGN_SW_STS to the SPDJB 32 or the BCM 92 (see FIGS. 1, 3, and 5). The SPDJB 32 of the BCM 92 transmits a multiplexed message of the signal IGN_SW_STS over the multiplexed bus. For systems 80, 100 and 120, the PEPS controller 82 transmits the signal IGN_SW_STS over the multiplexed bus to the various controllers or modules (see FIGS. 2, 4, and 6).

In block 304, the keys are monitored to determine if the keys were programmed to start the vehicle. The PATS controller 30 or the PEPS controller 82 is adapted to determine if the keys are valid for starting the vehicle. In the event the keys are not programmed or valid to start the vehicle, the method 300 moves to block 306. In the event keys are properly programmed, the method 300 moves to block 308.

In block 306, an error is detected. The PATS controller 30 or the PEPS controller 82 determines an error and may not allow the driver to start the vehicle in the event the keys are not properly programmed to the vehicle.

In block 308, the cluster 22 determines if the key is a primary key for the primary driver or if the key is a secondary key for the secondary driver. If the key is determined to be a primary key, then the method 300 moves to block 310. If the key is determined to be the secondary key, then the method 300 moves to block 312. If the key is not associated with a primary or a secondary driver, then the method 300 moves to the block 310.

In block 310, the primary driver may resume normal operation of the BSM and CTA feature. For example, the primary driver may elect to enable/disable the BSM feature and/or the CTA feature as desired via the cluster 22 and/or the SDM 112. The primary driver is capable of disabling/enabling the audible feature of the provided by sounder in the park aid module 58 or by the chime 28 of the cluster 22. As noted above, the primary driver may disable the park aid module 58 from generating the audible signal in the event the target vehicle is detected to be in the detection zone by the BSM/CTA module 70 and the subject vehicle is undergoing a lane change. Likewise, the primary driver may enable the park aid module 58 or the cluster 22 to generate the audible signal in the event the target vehicle is detected to be in the detection zone by the BSM/CTA module 70 and the subject vehicle is undergoing a lane change.

In block 312, the cluster 22 (or SDM 112) inhibits the BSM and the CTA disable (e.g., prevents the user from disabling the BSM and the CTA features) in response to determining that the driver of the vehicle is the secondary driver.

In block 314, the BSM/CTA module 70 monitors any such target vehicles that may be in the detection zone while performing the BSM and CTA operations.

In block 316, the BSM/CTA module determines whether any such target vehicle(s) are detected to be in the detection zone while performing the CTA operation. If a target vehicle is detected in the detection zone while performing the CTA operation, the method 300 moves to block 318. If a target vehicle is not detected in the detection zone while performing the CTA operation, the method 300 moves to block 320. It is generally contemplated that the BSM/CTA module 70 performs the CTA operation when the vehicle is in REVERSE.

In block 318, the BSM/CTA module 70 notifies the secondary driver. For example, the BSM/CTA module 70 may control the light indicator 72 to generate a flashing light, transmit the signal ALERT_1 to the parking aid module 58 to control sounder of the parking aid module 58 to generate audible signals, and may transmit a signal ALERT_2 to the cluster 22 so that the cluster 22 displays a text message in the display 24 to notify the driver that the target vehicle is approaching the subject vehicle and that the target vehicle is within the detection zone. Any one or more of the above responses may be executed in the event the BSM/CTA module 70 detects the presence of the target vehicle in the detection zone.

In block 320, the BSM/CTA module 70 determines whether the target vehicle is within the detection zone of the subject vehicle for the BSM operation. If the BSM/CTA module 70 determines that the target vehicle is not in the detection zone while performing BSM detection, the method 300 moves back to block 314. If the BSM/CTA module 70 determines that the target vehicle is within the detection zone while performing BSM detection, the method 300 moves to block 322. It is generally contemplated that the BSM/CTA module 70 performs the BSM operation when the vehicle is in any transmission state other than REVERSE.

In block 322, the BSM/CTA module 70 determines the status of the signal TURN_SIGNAL. If the signal TURN_SIGNAL corresponds to the turn signals being in an "on" state, then the method 300 moves to block 326. If the signal TURN_SIGNAL corresponds to the turn signal being in an "off" state, then the method 300 moves to block 324.

In block 324, the BSM/CTA module 70 controls the lighting device 72 to illuminate.

In block 326, the BSM/CTA module 70 controls the lighting device 72 to illuminate and transmits the signal ALERT_1 to the parking aid module 58 or the signal ALERT_2 to the cluster to generate the audible signal to notify the secondary driver that the target vehicle is in the detection zone. The cluster 22 (or SDM) 112 prevents the secondary driver from disabling the audible notification feature.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A system for controlling an operation of performing at least one of blind spot monitoring and cross traffic alert in a vehicle based on driver status, wherein at least one primary key is configured to be assigned to a primary driver and at least one secondary key is configured to be assigned to a secondary driver, the system comprising:

a controller configured to:
receive at least one driver status signal indicative of whether a driver of the vehicle is one of the primary driver and the secondary driver from a key ignition device;
determine whether the driver of the vehicle is one of the primary and the secondary driver based on the at least one driver status signal;
selectively control the operation of performing the at least one of blind spot monitoring and cross traffic alert based on the at least one driver status signal, and
prevent the driver from disabling the operation of performing the at least one of blind spot monitoring and cross traffic alert in response to the at least one driver status signal indicating that the driver of the vehicle is the secondary driver.

2. The system of claim 1 wherein the controller is further configured to allow the driver to enable/disable the operation of performing the at least one blind spot monitoring and cross traffic alert in response to determining that the driver of the vehicle is the primary driver.

3. The system of claim 1 wherein the controller is configured to transmit an alert signal in response to performing the operation of the at least one of blind spot monitoring and cross traffic alert.

4. The system of claim 3 further comprising a light indicator configured to receive the alert signal and to illuminate in response to performing the operation of the at least one of blind spot monitoring and cross traffic alert.

5. The system of claim 3 further comprising at least one of a sounder and a chime configured to receive the alert signal and to generate at least one audible signal in response to performing the operation of the blind spot monitoring.

6. The system of claim 5 wherein the controller is further configured to allow the driver to enable/disable an operation of generating the at least one audible signal in response to determining that the driver of the vehicle is the primary driver.

7. The system of claim 5 wherein the controller is further configured to enable the operation of generating the at least one audible signal and to prevent the driver from disabling the operation of generating the at least one audible signal in response to determining that the driver of the vehicle is the secondary driver.

8. A method for controlling an operation of performing at least one of blind spot monitoring and cross traffic alert in a vehicle based on driver status, wherein at least one primary key is configured to be assigned to a primary driver and at least one secondary key is configured to be assigned to a secondary driver, the method comprising:
receiving at least one driver status signal indicative of whether a driver of the vehicle is one of the primary driver and the secondary driver from a key ignition device;
determining whether the driver of the vehicle is one of the primary and the secondary driver based on the at least one driver status signal;
selectively controlling the operation of performing the at least one of blind spot monitoring and cross traffic alert based on the at least one driver status signal; and
preventing the operation of performing the at least one of blind spot monitoring and cross traffic alert from being disabled in the event the at least one driver status signal indicates that the driver of the vehicle is the secondary driver.

9. The method of claim 8 further comprising allowing the driver to enable/disable the operation of performing the at least one of blind spot monitoring and cross traffic alert in response to determining that the driver of the vehicle is the primary driver.

10. The method of claim 8 further comprising transmitting an alert signal in response to performing the operation of the at least one of blind spot monitoring and cross traffic alert.

11. The method of claim 10 wherein transmitting the alert signal further comprises transmitting the alert signal to a light indicator to illuminate in response to performing the operation of the at least one of blind spot monitoring and cross traffic alert.

12. The method of claim 10 wherein transmitting the alert signal further comprising transmitting the alert signal to at least one of a sounder and a chime to generate at least one audible signal in response to performing the operation of the blind spot monitoring.

13. The method of claim 12 further comprising allowing the driver to enable/disable the operation of transmitting the alert signal to the at least one of the sounder and the chime in response to determining that the driver of the vehicle is the primary driver.

14. The method of claim 12 further comprising enabling the operation of transmitting the alert signal to the at least one of the sounder and the chime and preventing the driver from disabling the operation of generating the at least one audible signal in response to determining that the driver of the vehicle is the secondary driver.

15. A system for controlling an operation of performing at least one of blind spot monitoring and cross traffic alert in a vehicle based on whether a driver is a primary driver and a secondary driver, the system comprising:
a first controller configured to associate at least one primary key to the primary driver and to associate at least one secondary key to the secondary driver and to generate at least one driver status signal indicative of whether the driver is one of the primary driver and the secondary driver; and
a second controller configured to:
receive at least one driver status signal;
determine whether the driver of the vehicle is one of the primary and the secondary driver based on the at least one driver status signal;
selectively control the operation of performing the at least one of blind spot monitoring and cross traffic alert based on the at least one driver status signal;
prevent the driver from disabling the operation of performing the at least one of blind spot monitoring and cross traffic alert in the event the at least one driver status indicates that the driver of the vehicle is the secondary driver.

16. The system of claim 15 wherein the second controller is further configured to allow the driver to enable/disable the operation of performing the at least one of blind spot monitoring and cross traffic alert in response to determining that the driver of the vehicle is the primary driver.

17. The system of claim 15 wherein the operation of performing blind spot monitoring includes detecting a presence of a first target vehicle in a detection zone that is defined as an area from outside minors of the vehicle to at least one meter beyond a bumper of the vehicle and the operation of performing cross traffic alert includes detecting a presence of a second target vehicle while the vehicle is departing from a parking spot within an area that is at least one meter away from a rear of the vehicle.

18. A device for controlling a blind spot monitoring operation based on driver status, the device comprising:
a controller configured to:

receive a driver status signal indicative of whether a driver is one of a primary driver and a secondary driver;
enable/disable the blind spot monitoring operation; and
prevent the blind spot monitoring operation from being disabled in response to the driver status signal indicating that the driver is the secondary driver.

19. The device of claim 18 wherein the controller is further configured to allow the driver to enable/disable the blind spot monitoring operation in response to determining that the driver of the vehicle is the primary driver.

* * * * *